Oct. 20, 1942.    T. W. ROSEBAUGH    2,299,426
PROCESS FOR EXTRACTION
Filed Dec. 28, 1940
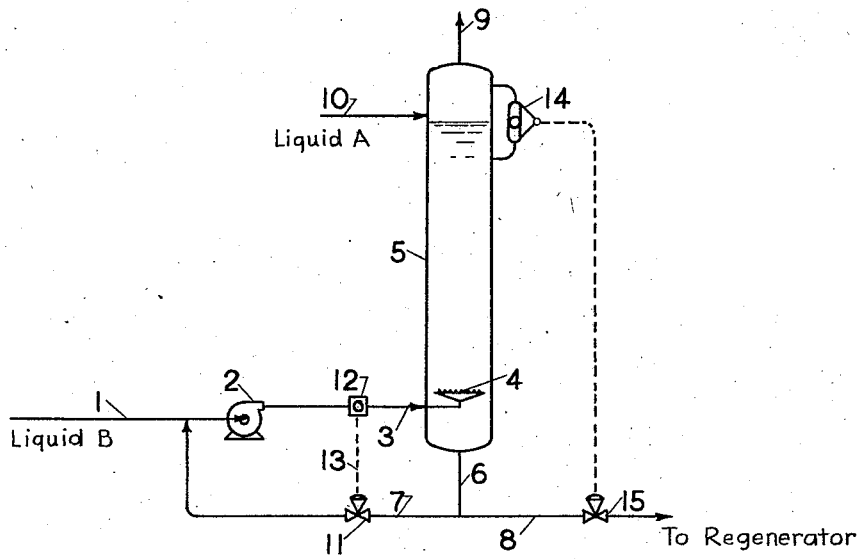
Fig. I
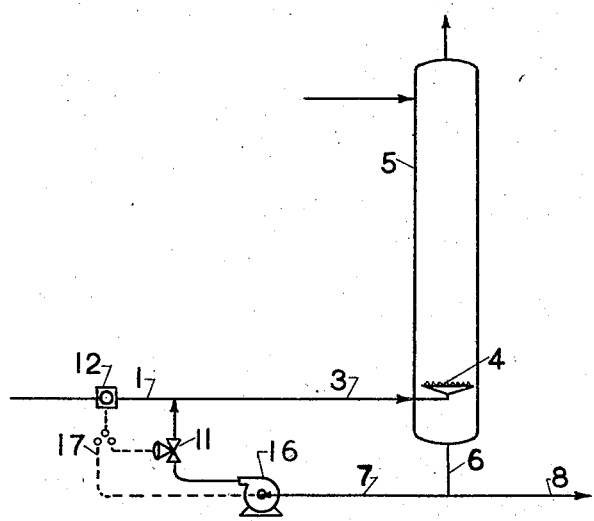
Fig. II
Inventor: Theodore W. Rosebaugh
By his Attorney:

Patented Oct. 20, 1942

2,299,426

UNITED STATES PATENT OFFICE 2,299,426

PROCESS FOR EXTRACTION

Theodore W. Rosebaugh, San Francisco, Calif., assignor to Shell Development Company, San Francisco, Calif., a corporation of Delaware Application December 28, 1940, Serial No. 372,207

6 Claims. (Cl. 23—310)

This invention relates to an improvement in the art of contacting two at least partially immiscible liquids for the purpose of achieving a chemical or physical interaction between them. My improved process and apparatus may be used with advantage in connection with any process or installation which involves the countercurrent flow of two liquids or liquid phases. Examples of such processes are the solvent extraction of liquid mixtures such as hydrocarbon mixtures with organic solvents, acid treatment of mineral oils, solutizer treatment of gasolines, etc. More specifically it deals with a method of maintaining uniformity of feed to packed towers under conditions of fluctuations in volume of one of the liquids.

It is an object of my invention to provide an improvement in processes and apparatus for contacting two liquids flowing countercurrently through a zone provided with contact means, whereby channeling is reduced and/or contact between the liquids is improved. It is a further object of my invention to provide an apparatus which will be automatic in operation and which will be economical to operate. Other objects of my invention will be apparent from the following disclosure of the invention.

It is known to contact mutually insoluble liquids having different specific gravities by introducing them at vertically spaced points of a column or tower and withdrawing the products at opposite vertically spaced points. Under these conditions one liquid, usually the solvent, is a continuous phase throughout the tower and the other liquid is a discontinuous phase passing through the continuous phase in a finely divided form. With a view to obtaining better contact it has been proposed to provide the tower with contact means. Under these conditions one liquid or phase often flows upwardly in small streams in certain parts only of the tower and the liquid phase flows downwardly in similar streams, but in another part of the tower, and as a result effective contact between them does not take place.

The above processes all require careful control to maintain efficient contact. In addition the flow of the liquids must be constant or else the operation of the tower becomes unsettled. Thus, the continuous phase often becomes the discontinuous phase and vice versa with the result that the effectiveness of the tower is markedly reduced.

Also, if the quantity of one of the liquids to be contacted is small, it may escape from the distributor header in one or two well-defined preferred courses with resultant channeling.

I have found that in contacting liquids in a chamber provided with contact means, channeling can be prevented and liquids can be brought into much more effective contact by operating at a constant hydraulic load at the feeder distributors such that the material to be treated is evenly dispersed throughout the contacting zone. By the term "contact zone" I means the space within a column or other container in which the two liquids or phases of differing specific gravity flow countercurrently while in intimate contact with each other. The contact means may consist of any suitable packing material, as described below, or a series of perforated plates which will aid in bringing the two liquids into effective contact.

This constant hydraulic loading of the feed distributors at a predetermined optimum liquid volume is maintained by recycling as much of one of the liquids after treatment as is necessary to compensate for fluctuations in the untreated feed or for deficiencies in the volume below the optimum. The volume of liquid entering the tower at the distributor thus becomes independent of the feed rate of the particular feed and can at all times be kept at or near its optimum value.

For convenience, I shall describe my invention in relation to an extraction system in which the lighter phase is the material to be treated, and the heavier phase flowing downward through the packed tower is the treating solvent.

Figure 1 of the attached drawing represents a simplified flow diagram of one form of my process.

Figure 2 shows a modification of a portion of the flow diagram of Figure 1.

Referring to Figure 1, an untreated feed which is subject to fluctuations in the rate of flow passes through line 1, impeller pump 2 and line 3 to the distributor header 4 in contact tower 5. The liquid flows upwardly in countercurrent to a treating solvent which enters the top of the tower through line 10. Spent solvent or extract is removed from the bottom of column 5 and is divided into two portions, one of which passes out of the system through line 8, and the other of which is returned to the lower part of column 5 through lines 7 and 3.

Valve 11 in line 7 controls the flow of that portion of the spent solvent which returns to the tower. Valve 11 is an automatic valve which is controlled by the flow meter 12 situated in line 3, through control connection 13. Flow meter 12 measures the volume of two combined liquids entering column 5 through line 3, i. e. of the returning spent solvent and the feed from line 1.

In tower 5 a predetermined liquid level is maintained by operation of valve 15 in bottom line 8, which valve is controlled by liquid level controller 14 located near the top or other suitable place of tower 5. Contacted feed emerges from the tower through top line 9.

In the modification of Figure 2 flow meter 12 is located in section 1 of the feed line leading to the lower portion of treater 5. This flow meter now controls either valve 11 or pump 16 both of which are situated in line 7. Switch 17 enables the alternate control. The liquid feed in line 1 is conveyed by a prime mover not shown, and the recycling portion of the spent solvent is conveyed by pump 16. Any fluctuation in the rate of feed in line 1 is immediately reflected by a compensating fluctuation in the flow through line 7, so that the resulting combined flow through line 3 remains constant.

My process has many applications, and it is not limited to any particular type of extraction, although by way of illustration some examples of its application are given below. For instance, it may find utility in the so-called solutizer process for the extraction of mercaptans from gasoline by means of an aqueous caustic solution containing solutizer. Thus, gasoline containing mercaptans enters the lower section of the extraction tower and flows upward in countercurrent to the solutizer solution which enters the tower near the top. The substantially spent solutizer solution is removed at the bottom of the tower and a portion thereof is diverted through the recycling line to be mixed with untreated feed in line 1 entering the tower. The remaining portion of spent solutizer solution is withdrawn to be regenerated and treated gasoline emerges through a line at the top of the tower.

Other applications deal with the removal of H₂S from liquefied normally gaseous hydrocarbons with an aqueous solution of tripotassium phosphate, sodium phenolate, sodium arsenite, an organic base, e. g. ethanolamine, diamino, isopropanol, etc.; or in the separation of aromatic from paraffinic components in hydrocarbon oils by the use of a suitable selective solvent, such as liquid sulfur dioxide, dichlorethyl ether, furfural, phenol, cresylic acids, nitrobenzene, etc., thereby producing raffinate and extract phases which are removed at opposite ends of the contact column. Normally, the solvent (or treating solution, as the case may be) and the oil are introduced through lines 10 and 1, respectively, and the extract and raffinate phases are withdrawn through lines 6 and 9, respectively, although the flow of the phases may be reversed, depending on their relative specific gravities. If desired, a portion of the phase issuing through line 9 may be recycled in a manner similar to the recycling described for a phase issuing through line 6.

My process is further illustrated by the following example: A normally gaseous hydrocarbon mixture liquefied under pressure and containing H₂S was fed to the bottom of a treating tower at the rate of 10.4 gallons/min. Aqueous $K_3PO_4$ solution entered the top of the tower at a constant rate and flowed countercurrent to the hydrocarbon oil. With different feeds this rate ranged from 2–5 gallons/min., depending upon the H₂S content of the feed. Spent $K_3PO_4$ emanating from the bottom of the tower was divided into two portions, one portion being injected into the hydrocarbon feed line to be returned to the tower at the rate of 8.8 gallons/min., together with the feed.

The contact between the two liquids during the entire operation was satisfactory, resulting in the expected degree of H₂S removal from the hydrocarbon feed, whereas prior to the expedient of recirculating a portion of the spent $K_3PO_4$ solution as described, the H₂S removal frequently dropped below expectancy because of poor contact between the two liquids in the contact tower.

Numerous modifications of my apparatus to meet varying conditions will be apparent to those skilled in the art. Thus, the valve control system may be operated electrically by air pressure or by a float mechanism. Additional pumps may be arranged according to operating necessity. The tower may be provided with coils or a jacket for maintaining a gradual temperature gradient from a low temperature near the extract phase outlet to a higher temperature at the opposite end of the zone, thereby further improving the extraction efficiency.

As used in the present specification and claims the term "solvent" is intended to include solvent mixtures. The term "component" is not limited to pure substances but is intended to include groups of substances which exhibit similar properties in relation to a selective solvent. The terms "liquid," "liquid mixture" and "solution," as herein used, are synonymous.

I claim as my invention:

1. In the process of countercurrently contacting two relatively immiscible liquids, one of which has a predetermined substantially constant rate of flow while the other has a rate of flow subject to fluctuation, in which process the resulting contacted liquids are withdrawn at opposite ends of a contact zone in which the liquids flow countercurrently while in intimate contact with each other, the improvement comprising dividing out a portion of the contacted liquid having a constant rate of flow which has been withdrawn from the contact zone and returning said portion to said contact zone at a point intermediate between the two points of removal of the contacted liquids, combining the fluctuating liquid with the said portion being returned, and positively controlling the volume of said portion in inverse relation to the volume of said fluctuating liquid to compensate for said fluctuations whereby a constant rate of flow of the combined liquids is maintained.

2. In the process of countercurrently contacting two partially immiscible liquids, one of which has a predetermined volume of flow for maximum efficiency while the other has a volume of flow subject to fluctuation and is small as compared to the first, in which process the resulting contacted liquids are withdrawn at opposite ends of a contact zone in which the liquids flow countercurrently while in intimate contact with each other, the improvement comprising dividing out a portion of the contacted liquid which has a predetermined volume of flow which has been withdrawn from the contact zone and returning said portion to said contact zone at a point intermediate between the two points of removal of the contacted liquids, combining the fluctuating liquid with the said portion being returned, and positively controlling the volume of said portion in inverse relation to the volume of said fluctuating liquid to compensate for said fluctuations whereby a constant rate of flow of the combined liquids is maintained.

3. In an apparatus for countercurrently contacting two liquids, the combination of an extraction tower with inlet pipes for admitting said liquids at points in the upper and lower sections of said tower respectively, and outlet pipes for withdrawing contacted liquids adjacent the respective opposite ends of said tower, a conduit connecting the outlet pipe for at least one of said liquids with the inlet pipe for the other liquid, a flow regulator in said conduit, a flow meter in said inlet pipe to which said conduit is connected, said flow meter being cooperatively connected with said flow regulator to vary the flow of liquid through said conduit in inverse relation to the flow of said other liquid through the inlet pipe.

4. In an apparatus for countercurrently contacting two liquids comprising an exraction tower with inlet pipes for admitting said liquids at points in the upper and lower sections of said tower respectively and outlet pipes for withdrawing contacted liquids adjacent the respective opposite ends of said tower, a conduit connecting the outlet pipe for at least one of said liquids with the inlet pipe for the other liquid, a flow regulator in said conduit, a flow meter in said inlet pipe between the point of connection of said conduit to said inlet pipe and the point of connection of said inlet pipe to said tower, said flow meter being cooperatively connected with said flow regulator to vary the flow of liquid through said conduit in inverse relation to the flow of said other liquid through the inlet pipe.

5. Apparatus for countercurrently contacting two liquids comprising an extraction tower with inlet pipes for admitting said liquids at points in the upper and lower sections of said tower respectively and outlet pipes for withdrawing contacted liquids adjacent the respective opposite ends of said tower, a conduit connecting the outlet pipe for at least one of said liquids with the inlet pipe for the other liquid in combination with a valve in said conduit, a flow meter in said inlet pipe for the second liquid measuring the volume of liquid passing therethrough, and regulating means cooperatively connecting said valve means and said flow meter so connected as to vary the flow of liquid through said conduit in inverse relation to the flow of said second liquid through the inlet pipe.

6. Apparatus for countercurrently contacting two liquids comprising an extracting tower with inlet pipes for admitting said liquids at points in the upper and lower sections of said tower respectively and outlet pipes for withdrawing contacted liquids adjacent the respective opposite ends of said tower, a conduit connecting the outlet pipe for at least one of said liquids with the inlet pipe for the other liquid in combination with a pump in said conduit, a flow meter in said inlet pipe for the second liquid adapted to measure the flow of said untreated feed and regulating means cooperatively connecting said pump and said flow meter so connected as to vary the flow of liquid through said conduit in inverse relation to the flow of said second liquid through the inlet pipe.

THEODORE W. ROSEBAUGH.